United States Patent [19]

Tobita et al.

[11] 4,231,130
[45] Nov. 4, 1980

[54] AUTOMATIC WASHING MACHINE AND METHOD FOR OPERATING THE SAME

[75] Inventors: Hideyuki Tobita, Hitachi; Toshio Mori, Katsuta, both of Japan

[73] Assignee: Hitachi, Ltd., Japan

[21] Appl. No.: 21,187

[22] Filed: Mar. 16, 1979

[30] Foreign Application Priority Data

Mar. 20, 1978 [JP] Japan .................................. 53-30949

[51] Int. Cl.³ .......................................... D06F 33/02
[52] U.S. Cl. ...................................... 8/159; 68/12 R
[58] Field of Search .......................... 68/12 R; 8/159; 134/57 R, 57 D, 58 R, 58 D; 307/141, 141.4

[56] References Cited

U.S. PATENT DOCUMENTS

| | | | |
|---|---|---|---|
| 4,084,237 | 4/1978 | Beachem et al. | 134/58 R X |
| 4,104,542 | 8/1978 | Karklys et al. | 307/141.4 X |
| 4,106,517 | 8/1978 | Wright | 68/12 R X |

Primary Examiner—Philip R. Coe
Attorney, Agent, or Firm—Craig & Antonelli

[57] ABSTRACT

An automatic washing machine capable of automatically carrying out a programmed sequence of a washing operation, a rinsing operation and/or a spinning or extracting operation, and a method for operating such a washing machine, in which a newly selected operation program is compared with an already selected operation program, and when the already selected operation program includes an operation included in the newly selected operation program, the operation in the already selected operation program corresponding to that in the newly selected operation program is only continuously carried out for improving the utility of the automatic washing machine.

5 Claims, 17 Drawing Figures

| OPERATION PROGRAM | TYPE OF WASHING | WASHING | RINSING | SPINNING |
|---|---|---|---|---|
| S₁ HEAVY SOIL | STRONG | STRONG | STRONG | STRONG |
| S₂ MEDIUM SOIL | STRONG | STANDARD | STANDARD | STRONG |
| S₃ LIGHT SOIL | MEDIUM | ECONOMY | ECONOMY | MEDIUM |
| S₄ SWEATER | SOFT | SHORT | ECONOMY | SOFT |
| S₅ SHIRT | STRONG | STANDARD | STANDARD | SOFT |
| S₆ DIAPER | STRONG | ECONOMY | STRONG | STRONG |

FIG. 6
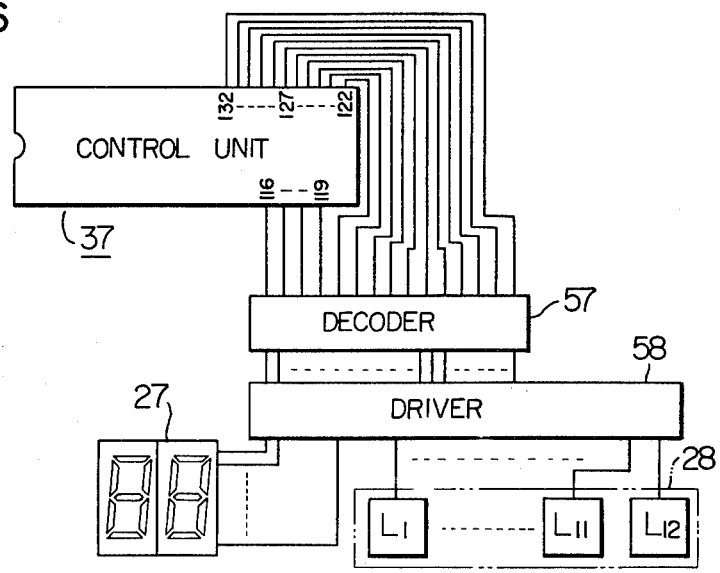
FIG. 7
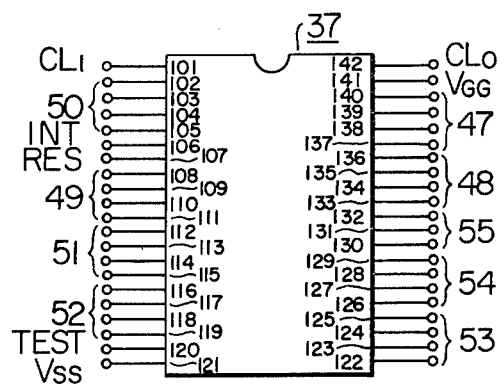
FIG. 8
| | OPERATION CYCLE | WASHING | RINSING | SPINNING |
|---|---|---|---|---|
| I | WASHING | ////// | | |
| II | RINSING→SPINNING | | ////// | ////// |
| III | WASHING→RINSING | ////// | ////// | |
| IV | DRAINING·SPINNING | | | ////// |
| V | AGITATING WITH ADDITIVE | | ////// | |

FIG. 9

| OPERATION\STEP ITEM | WASHING | | | RINSING | | | | | SPINNING | |
|---|---|---|---|---|---|---|---|---|---|---|
| | FILLING | AGITATING | DRAINING | SPINNING/RINSING | | SHOWERING/SPINNING | INTER-MITTENT SPINNING | FEEDING/RINSING | | SPINNING |
| | | | | DRAINING | INTER-MITTENT SPINNING | | | FILLING | FEEDING/AGITATING | DRAINING | CONTINUOUS SPINNING |
| DURATION | T | 10 MIN. | $t_2$ | 2.5 MIN. | $T_1$ | 2.5 MIN. | $t_{1a}$ | $T_3$ | $t_{2a}$ | 5 MIN. |
| PRESSURE SWITCH 34 | L→H | H | H→L | L | L | L | L→H | H | H→L | L |

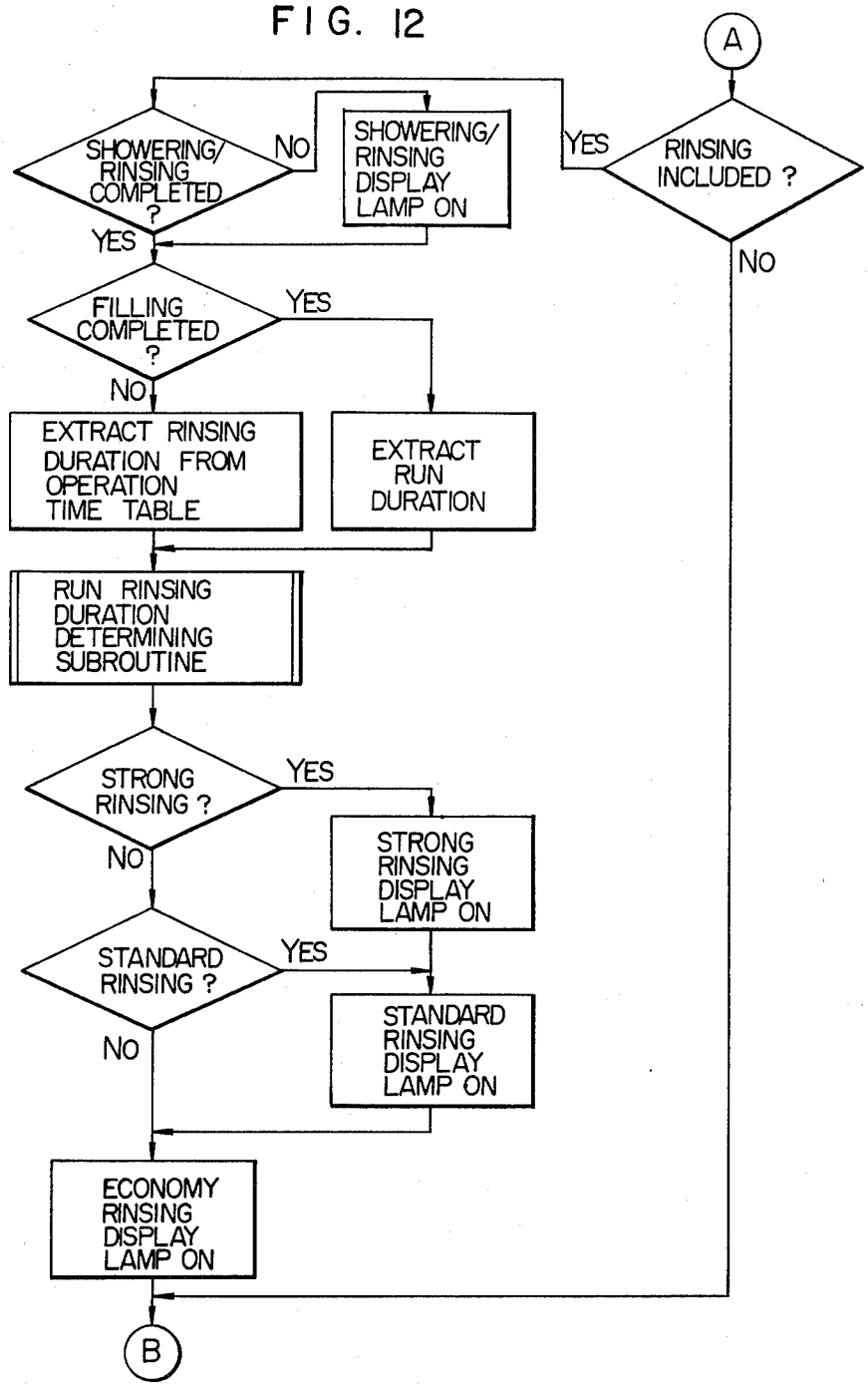

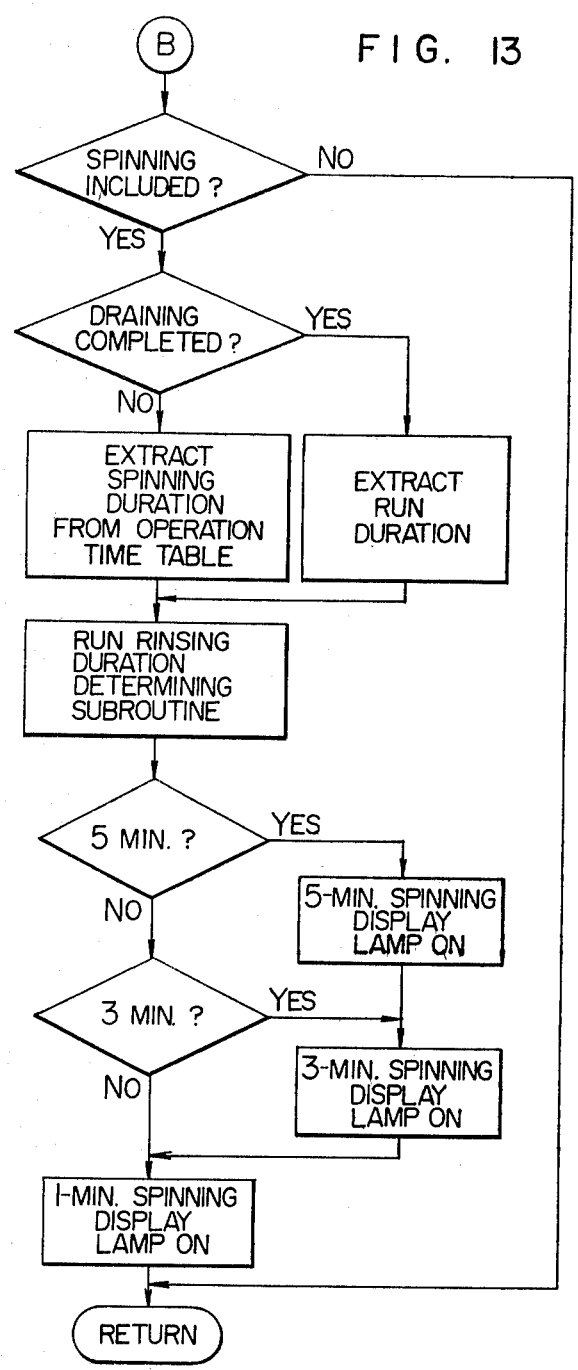

FIG. 14

| SELECTED PROGRAM | PROGRAM MODIFICATION | PROGRESSION DISPLAY LAMP | | |
|---|---|---|---|---|
| | | WASHING | RINSING | SPINNING |
| HEAVY SOIL | — | ⊘ ⊘ ⊘ ⊘ ⊘ | ⊘ ⊘ ⊘ ⊘ | ⊘ ⊘ ⊘ |
| HEAVY SOIL | WASHING ONLY | ⊘ ⊘ ⊘ ⊘ ⊘ | ○ ○ ○ ○ | ○ ○ ○ |
| HEAVY SOIL | RINSING → SPINNING | ○ ○ ○ ○ ○ | ⊘ ⊘ ⊘ ⊘ | ⊘ ⊘ ⊘ |
| HEAVY SOIL | WASHING → RINSING | ⊘ ⊘ ⊘ ⊘ ⊘ | ⊘ ⊘ ⊘ ⊘ | ○ ○ ○ |
| HEAVY SOIL | DRAINING·SPINNING | ○ ○ ○ ○ ○ | ○ ○ ○ ○ | ⊘ ⊘ ⊘ |
| HEAVY SOIL | AGITATING WITH ADDITIVE | ○ ○ ○ ○ ○ | ○ ○ ○ ⊘ | ⊘ ⊘ ⊘ |
| MEDIUM SOIL | WASHING ONLY | ○ ⊘ ⊘ ⊘ ⊘ | ○ ○ ○ ○ | ○ ○ ○ |
| MEDIUM SOIL | RINSING → SPINNING | ○ ○ ○ ○ ○ | ⊘ ○ ⊘ ⊘ | ⊘ ⊘ ⊘ |
| MEDIUM SOIL | WASHING → RINSING | ○ ⊘ ⊘ ⊘ ⊘ | ⊘ ○ ⊘ ⊘ | ○ ○ ○ |
| MEDIUM SOIL | DRAINING·SPINNING | ○ ○ ○ ○ ○ | ○ ○ ○ ○ | ⊘ ⊘ ⊘ |
| LIGHT SOIL | WASHING ONLY | ○ ○ ○ ⊘ ⊘ | ○ ○ ○ ○ | ○ ○ ○ |
| LIGHT SOIL | RINSING → SPINNING | ○ ○ ○ ○ ○ | ⊘ ○ ○ ⊘ | ○ ⊘ ⊘ |
| LIGHT SOIL | WASHING → RINSING | ○ ○ ○ ⊘ ⊘ | ⊘ ○ ○ ⊘ | ○ ○ ○ |
| LIGHT SOIL | DRAINING·SPINNING | ○ ○ ○ ○ ○ | ○ ○ ○ ○ | ○ ⊘ ⊘ |
| SWEATER | WASHING ONLY | ○ ○ ○ ○ ⊘ | ○ ○ ○ ○ | ○ ○ ○ |
| SWEATER | RINSING → SPINNING | ○ ○ ○ ○ ○ | ⊘ ○ ○ ⊘ | ○ ○ ⊘ |
| SWEATER | WASHING → RINSING | ○ ○ ○ ○ ⊘ | ⊘ ○ ○ ⊘ | ○ ○ ○ |
| SWEATER | DRAINING·SPINNING | ○ ○ ○ ○ ○ | ○ ○ ○ ○ | ○ ○ ⊘ |

FIG. 17

| MODE | PROGRESSION DISPLAY LAMP | | |
|---|---|---|---|
| | WASHING | RINSING | SPINNING |
| $X_1$ | O ⊘ ⊘ ⊘ ⊘ | ⊘ O ⊘ ⊘ | ⊘ ⊘ ⊘ |
| $X_2$ | O O ⊘ ⊘ ⊘ | ⊘ O ⊘ ⊘ | ⊘ ⊘ ⊘ |
| $X_3$ | O O ⊘ ⊘ ⊘ | O O O O | O O O |
| $X_4$ | O O ⊘ ⊘ ⊘ | ⊘ O ⊘ ⊘ | O O O |
| $X_5$ | O O O O O | ⊘ O ⊘ ⊘ | O O O |
| $X_6$ | O O O O O | ⊘ O ⊘ ⊘ | ⊘ ⊘ ⊘ |
| $X_7$ | O O O O O | O O O ⊘ | ⊘ ⊘ ⊘ |
| $X_8$ | O O O O O | O O O ⊘ | O O O |
| $X_9$ | O O O O O | O O O O | ⊘ ⊘ ⊘ |
| $X_{10}$ | O O O O O | O O O O | O O ⊘ |
| $X_{11}$ | O ⊘ ⊘ ⊘ ⊘ | ⊘ O ⊘ ⊘ | O O O |

AUTOMATIC WASHING MACHINE AND METHOD FOR OPERATING THE SAME

This invention relates to an automatic washing machine capable of automatically carrying out an operation program comprising a programmed sequence of a washing operation, a rinsing operation and a spinning or extracting operation, and relates also to a method for operating such an automatic washing machine.

A mid-course modification of an operation program, for example, an extension, an omission or an alteration of part of an operation program is frequently desired by an operator operating an automatic washing machine. For example, the operator of the automatic washing machine will desire to stop the washing operation and to start the rinsing operation when soil is sufficiently removed from clothes or the like in the course of the washing operation, or the operator will desire to extend the washing duration alloted to the washing operation when soil is not sufficiently removed from clothes or the like during the washing operation. Further, the operator of the automatic washing machine may change her mind during the progression of the washing operation and may desire to stop the washing operation and to start the spinning or extracting operation, or the operator may desire to continue the machine operation without a stop although such a stop has been set in the operation program selected by the operator.

For the purpose of various modifications as described above, it has been necessary to entirely clear an operation program being run and to reset a new operation program, and this requirement has resulted in a degraded utility of the automatic washing machine.

It is therefore a primary object of the present invention to provide an efficiently operable automatic washing machine which permits a mid-course modification of an operation program being run without the necessity for clearing the entirety of the operation program, and also to provide a method for operating such an automatic washing machine.

The present invention which attains the above object is featured by the fact that a newly selected operation program is compared with an already selected operation program, and when the already selected operation program includes an operation included in the newly selected operation program, the operation of the already selected operation program corresponding to that included in the newly selected operation program is only continuously carried out.

The above and other objects, features and advantages of the present invention will become more apparent from the following detailed description of preferred embodiments thereof taken in conjunction with the accompanying drawings, in which:

FIG. 6 is a functional block diagram of a display circuit controlled by the control device shown in FIG. 5;

FIG. 7 is a top plan view showing the arrangement of various signal terminals of the control device shown in FIG. 5;

FIG. 8 illustrates a plurality of modified operation cycles which are provided by an operation selector switch array arranged on the console panel shown in FIG. 2 so as to modify the operation programs shown in FIG. 3;

FIG. 9 illustrates a practical example of an operation program selected by the automatic operation program selector switch array arranged on the console panel shown in FIG. 2;

FIG. 12 is a flow chart showing a manner of displaying the progression of a rinsing operation by the progression display;

FIG. 13 is a flow chart showing a manner of displaying a spinning operation by the progression display;

FIG. 14 illustrates various examples of displays by the display lamps of the progression display selectively energized according to the selective depression of the button switches of the automatic operation program selector switch array and operation selector switch array shown in FIG. 2;

FIG. 17 illustrates various examples of displays by the display lamps of the progression display selectively energized to conform to mid-course modifications of an already selected operation program.

A preferred embodiment of the automatic washing machine according to the present invention will now be described in detail with reference to the accompanying drawings.

Figure 1:
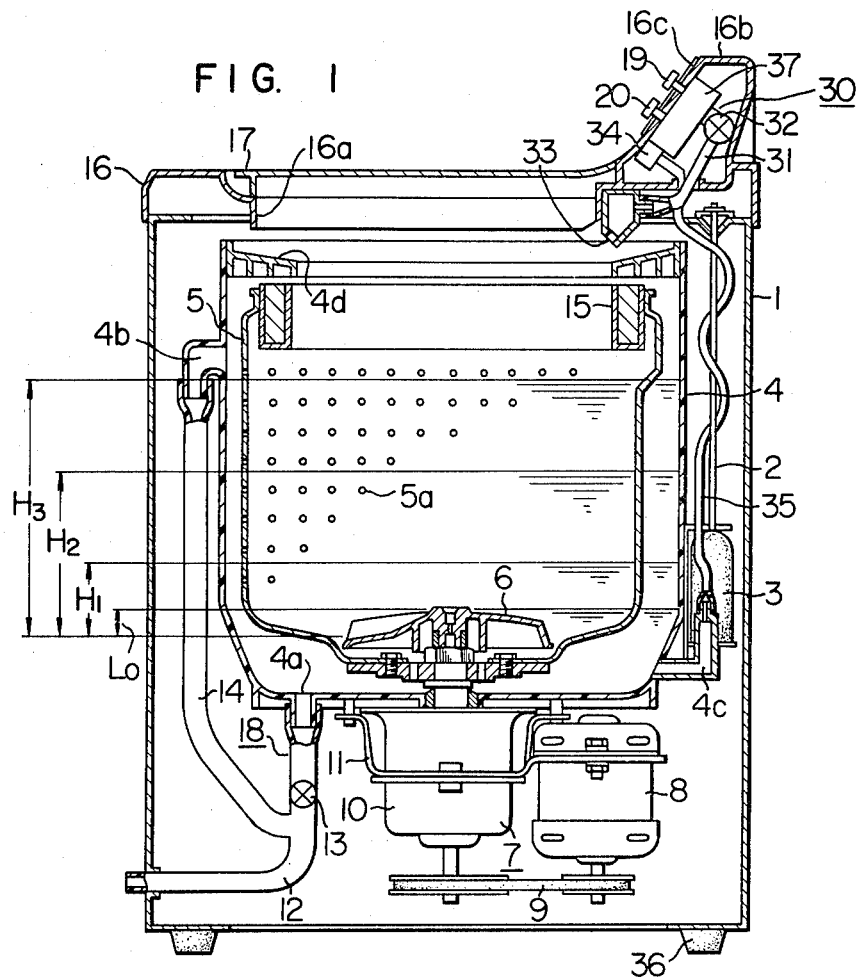
FIG. 1 is a vertical sectional view of principal parts of an embodiment of the automatic washing machine according to the present invention.

Referring first to FIG. 1 of the drawings, the automatic washing machine embodying the present invention comprises an outer housing or cabinet 1 made of a steel or like material in which an outer tub 4 of a synthetic resin material, steel or the like is suspended by means of suspension rods 2 connected to vibration dampers 3 in the form of coil springs or elastic rubber members. Although only one set of the combination of the suspension rod 2 and vibration damper 3 is shown in FIG. 1, four sets of such elements are actually provided to suspend the outer tub 4 to prevent it from vibration.

A rotatable perforate basket tub 5 is concentrically disposed within the outer tub 4 which is adapted to be filled with a washing liquid such as water used for the washing purpose. The basket tub 5 may be made of a synthetic resin material or an enamelled metal sheet and is formed with a large number of water extracting perforations 5a for the purpose of extracting the washing liquid or water from clothes or the like under a centrifugal force during a spinning or extracting operation which may be carried out after a washing or rinsing operation. In other words, clothes or the like to be washed are received in the washing and spinning basket tub 5 to be agitated to remove soil and finally centrifuged to remove more liquid from the fabric after the rinsing operation. For the purpose of washing and rinsing the clothes or the like, an agitator, or in a broader sense, a pulsator 6 is disposed rotatably at the center of the inner bottom of the washing and spinning basket tub 5. During the washing and rinsing operations, the washing and spinning basket tub 5 is held stationary, while the pulsator 6 is rotated in one (normal) direction and/or the other (reverse) direction. During the spinning or extracting operation carried out for extracting water from the clothes or the like under the centrifugal force, both the washing and spinning basket tub 5 and the pulsator 6 are rotated at the same speed in the same direction. The rotation of the pulsator 6 and the washing and spinning basket tub 5 is controllably effected by a drive unit 7.

The drive unit 7 includes an electric motor 8, a transmission 9 composed of pulleys and a belt for transmitting the drive force of the rotating motor 8 to the pulsator 6 and/or the washing and spinning basket tub 5, a clutch mechanism 10 adapted to selectively rotate the pulsator 6 solely or together with the washing and spinning basket tub 5, and a brake mechanism (not shown) for braking the rotation of the washing and spinning basket tub 5. The drive unit 7 is fixedly mounted on the outer bottom wall of the outer tub 4 by means of a supporting bracket 11 made of a steel.

The outer tub 4 is provided with a drain port 4a for draining water from within the outer tub 4, an overflow port 4b for draining an excess of water during a rinsing operation rinsing clothes or the like with overflowing water, and a pressure admission port 4c for sensing the pressure of water contained in the outer tub 4. Mounted on the inner wall of the outer tub 4 at the top opening thereof is a cover member 4d made of a synthetic resin material, steel or the like for preventing the articles such as clothes or the other from falling into the space defined between the outer tub 4 and the basket tub 5. A drain system 18 including a drain conduit 12 and an electromagnetic drain valve 13 is disposed beneath the outer bottom of the outer tub 4. The drain conduit 12 is press-fitted at one end thereof on the drain port 4a and extends at the other end thereof to the exterior of the cabinet 1. An overflow conduit 14 is connected at one end thereof to the overflow port 4b and at the other end thereof to the drain conduit 12. Thus, water overflowing from the outer tub 4 into the overflow port 4b is directly drained to the exterior of the cabinet 1 by way of the overflow conduit 14 and the drain conduit 12 independently of the operation of the electromagnetic drain valve 13. A tub ring or balancing ring 15 is secured to the inner periphery of the top opening of the basket tub 5. A top cover member 16 of a synthetic resin or like material is fixed to the upper end of the cabinet 1 and is formed with an access opening 16a for allowing the articles to be charged into or taken out from the basket tub 5 and a console box 16b for accommodating various electric and electronic parts therein. A lid 17 of a synthetic resin or like material openably closes the access opening 16a of the top cover member 16.

Figure 2:
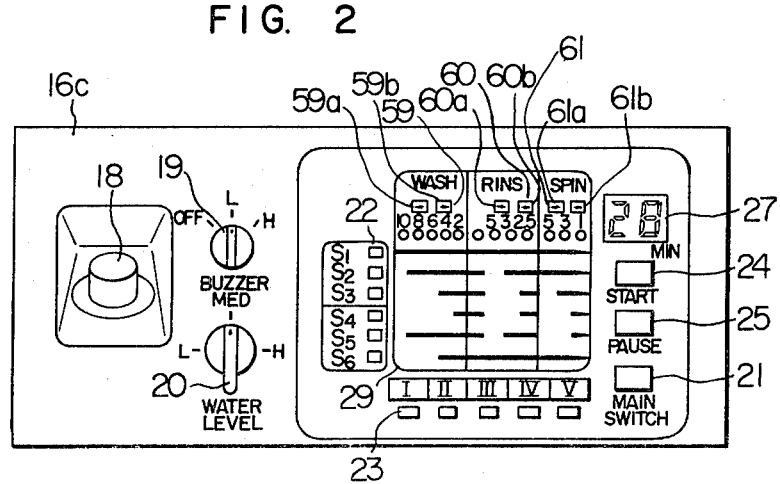
FIG. 2 is a plan view of a console panel preferably employed in the automatic washing machine shown in FIG. 1.

The front face of the console box 16 provides an operator console panel 16c as shown in FIG. 2. It will be seen in FIG. 2 that the console panel 16c includes a water feed port 18, a buzzer sound level selection knob 19, a water level selection knob 20, a main switch 21, an automatic operation program selector switch array 22, an operation selector switch array 23, a start switch 24, a pause switch 25, a two-digit alphanumerical display 27 displaying the remaining of the machine run time and other information as required, a progression display 28 composed of, for example, twelve display lamps displaying the progression of a selected operation program, and a display bar zone 29 displaying, for example, six operation programs selectable by the automatic operation program selector switch array 22. The pause switch 25 is depressed when the operator desires a temporary pause of the machine operation. The start switch 24 is depressed to place the automatic washing machine in operation again from the non-operative state.

Referring to FIG. 1 again, a water feed system 30 includes a water feed conduit 31, an electromagnetic feed valve 32 and a shower head 33. The electromagnetic feed valve 32 is disposed within the console box 16b. Water fed from a source of water supply to the feed port 18 flows into the outer tub 4 through the feed conduit 31, the electromagnetic feed valve 32 and the shower head 33.

A pressure switch 34 is disposed within the console box 16b to sense the pressure of water in the lower portion of the outer tub 4 thereby detecting whether the outer tub 4 is filled with water up to one of a plurality of predetermined levels. This pressure switch 34 is composed of a reed switch, a permanent magnet, a restoring spring and other necessary elements. A tube 35 of polyvinyl chloride or like material is connected between the pressure switch 34 and the pressure admission port 4c of the outer tub 4 so that the pressure of water in the lower portion of the outer tub 4 can be sensed by the pressure switch 34. Four legs 36 of an elastic material resiliently support the bottom of the cabinet 1 so as to absorb or damp vibrations of the automatic washing machine.

The six operation programs which can be selected by button switches $S_1$ to $S_6$ of the automatic operation program selector switch array 22 carry out a programmed sequence of a washing operation, a rinsing operation and a spinning or extracting operation, although these programs are different from each other in respect of the duration of at least one of the operations.

Figures 3, 5:
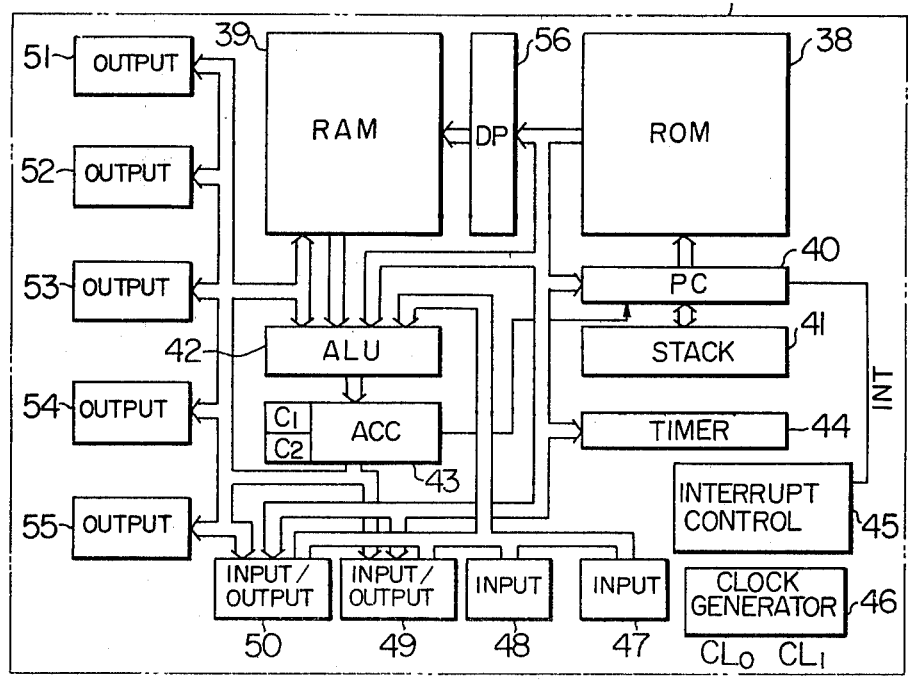
FIG. 3 illustrates a plurality of operation programs which can be selected by an automatic operation program selector switch array disposed on the console panel of the automatic washing machine shown in FIG. 1.
FIG. 5 is a functional block diagram of a control device accommodated in a console box of the automatic washing machine shown in FIG. 1.

Exemplary relationships between the programmed contents of these six operation programs and the types of operations are shown in FIG. 3. As can be seen from FIG. 3, the six operation programs include three operation programs which can be selected depending on the soiled degree or state of articles such as clothes to be washed, that is, depending on the necessity for removal of heavy soil, medium soil and light soil respectively from the articles or clothes to be washed. The remaining three operation programs are suitable for the washing of, for example, sweaters, shirts and diapers respectively. In the six operation programs shown in FIG. 3, the washing operation is so preset as to provide the relation "strong">"standard">"economy">"short" in terms of the length of time required for the pulsator 6 to rotate during such an operation. The rinsing operation is so preset as to provide the relation "strong">"standard">"economy" in terms of the length of time required for the pulsator 6 to rotate during such an operation. The spinning or extracting operation is so preset as to provide the relation "strong">"medium">"soft" in terms of the length of time required for the basktt tub 5 to rotate during such an operation. Thus, an operation program suitable for treating the amount of articles to be washed or dealing with the soiled degree of such articles can be selected by suitably depressing one of the button switches $S_1$ to $S_6$ of the automatic operation program selector switch array 22.

The combination of the washing operation, rinsing operation and spinning operation in the selected operation program can be modified as described by selective depression of button switches I, II, III, IV and V of the operation selector switch array 23. As shown in FIG. 8, depression of the button switch I modifies the program so that a cycle including only the washing operation with water is carried out. Depression of the button switch II modifies the program so that a cycle including the rinsing operation followed by the spinning operation but not including the washing operation is carried out. Depression of the button switch III modifies the program so that a cycle including the washing operation followed by the rinsing operation but not including the spinning operation is carried out. Depression of the button switch IV modifies the program so that a cycle including the spinning operation only is carried out. Depression of the button switch V modifies the program so that a cycle including the latter half of the rinsing operation followed by the spinning operation but not including the washing operation and the former half of the rinsing operation is carried out. The programmed cycle carried out by the depression of the button switch V is suitable for adding a finishing agent to the articles to be washed and will be referred to as "agitation with additive". The washing operation carried out by the depression of the button switch I of the operation selector switch array 23 is classified into a "strong" washing operation, a "medium" washing operation and a "soft" washing operation depending on the selective depression of the button switches $S_1$ to $S_6$ of the automatic operation program selector switch array 22, as illustrated in FIG. 3. As described previously, the pulsator 6 is rotated during the washing operation for the length of time which meets the "strong", "medium" or "soft" washing operation selected by the selective depression of the button switches $S_1$ to $S_6$ together with the depression of the button switch $I_1$ of the operation selector switch array 23.

The main switch 21 disconnectably electrically connects the automatic washing machine to a power supply such as a commercial AC power source. The progression display 28 indicating the progression of an operation program to the operator or user comprises a first group of five display lamps $L_1$, $L_2$, $L_3$, $L_4$ and $L_5$ for displaying the progression of the washing operation, a second group of four display lamps $L_6$, $L_7$, $L_8$ and $L_9$ for displaying the progression of the rinsing operation, and a third group of three display lamps $L_{10}$, $L_{11}$ and $L_{12}$ for displaying the progression of the spinning operation. Each of these display lamps $L_1$ to $L_{12}$ may preferably include a light-emitting diode which has a long useful life. The buzzer sound level selection knob 19 is provided to change over the sound level produced by a buzzer (not shown) disposed in the console box 16b among a "high" level, a "low" level and "off". The water level selection knob 20 is manipulated to set the water level in the outer tub 4 at one of preset levels. Water can be filled up to a high level $H_3$, a medium level $H_2$ and a low level $H_1$ as shown in FIG. 1 when the knob 20 is turned to its "high", "medium" and "low" positions respectively.

Figure 4:
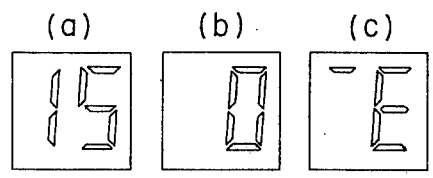
FIG. 4 illustrates three examples of symbolic displays provided by an alphanumeric display disposed on the console panel shown in FIG. 2.

Examples of symbolic displays provided by the two-digit alphanumerical display 27 which may be a matrix of light-emitting diodes are illustrated in FIG. 4. When, for example, the remaining run time of the machine operation is between 14 minutes and 15 minutes, "15" is displayed on the display 27 as shown in (a) of FIG. 4. In the same sense, "0" is displayed as shown in (b) of FIG. 4 when the remaining run time is within 1 minute. On the other hand, when the outer tub 4 has not been filled with water up to a predetermined level within a predetermined length of time during a filling operation, a bar "-" and a letter "E" indicating an inlet error are displayed as shown in (c) of FIG. 4. Further, the alphanumeric display 27 displays a letter "P" to indicate a temporary stop or pause when the washing machine is not in operation. This display "P" on the alphanumeric display 27 is cleared in response to the depression of the start switch 24. The pause display "P" is displayed on the alphanumeric display 27 in response to the depression of the pause switch 25 during an operation.

Referring to FIG. 1 again, a control device 37 is disposed in the console box 16b. This control device 37 controls the operations of the drive unit 7, the water feed system 30, the drain system 18, the alphanumeric display 27, the progression display 28 and other necessary units in accordance with a selected operation program so that the washing machine can automatically carry out a programmed sequence of a washing operation, a rinsing operation and a spinning or extracting operation. The control device 37 may preferably be in the form of a microcomputer, and its functional block diagram is shown in FIG. 5. Referring to FIG. 5, the control device 37 comprises a read-only memory (ROM) 38, a random access memory (RAM) 39, a program counter (PC) 40, a stack register (STACK) 41, an arithmetic logic unit (ALU) 42, an accumulator (ACC) 43, a timer (TIMER) 44, an interrupt control circuit (INT) 45, a clock generator (CG) 46, input sections 47 and 48, input/output sections 49 and 50, output sections 51, 52, 53, 54 and 55, and a data pointer (DP) 56. In FIG. 5, the double-arrow lines denote data buses and address buses.

The operation programs for operating the washing machine are stored in the read-only memory 38 together with the conditions for generating various instructions and the rules required for the processing of various information. For example, the operating sequences and operating durations of the six operation programs selected by the automatic operation program selector switch array 22 are programmed by the combinations of instruction codes and are stored in the ROM 38.

Data derived during the progression of a selected operation program are stored in the random access memory 39. For example, the length of time required for filling the outer tub 4 to a predetermined level during an initial filling operation is measured, and its data is stored in the RAM 39.

The program counter 40 addresses the operation programs stored in the ROM 38. The stack register 41 functions to hold the contents of the PC 40 in response to the origination of a call for a subroutine or a request for interrupt processing. The timer 44 sets a time limit in response to a timer setting instruction so that one of the operation programs stored in the ROM 38 and selected by the operator can be carried out to meet the time limit requirement set by the timer 44. The interrupt control circuit 45 functions to interrupt the presently progressing operation program in response to the application of an interrupt processing request signal and receive other data. The clock generator 46 generates a clock pulse signal for controlling the operating timing of all the units of the control device 37. The arithmetic logic unit 42 has the functions of executing arithmetic operations, decisions, etc. and constitutes the heart of the control device 37 together with the accumulator 43 which stores the results of the arithmetic operations and the processed data. The symbol $C_1$ in the block representing the ACC 43 denotes a carry flip-flop, and $C_2$ denotes a carry hold flip-flop. The carry flip-flop $C_1$ indicates the presence or absence of a carry and a borrow appearing as a result of addition and subtraction respectively. Thus, in the case of addition, $C=1$ indicates a carry, and $C=0$ indicates no carry. Similarly, in the case of subtraction, $C=1$ indicates a borrow, and $C=0$ indicates no borrow. The carry hold flip-flop $C_2$ acts to temporarily hold the contents of the carry flip-flop $C_1$ transferred thereto when an interrupt processing request signal is applied to the INT 45.

The output signals of the automatic operation program selector switch array 22, water level selection knob 20, buzzer sound level selection knob 19, start switch 24, pause switch 25 and main switch 21 are applied to the input sections 47, 48 and to the input/output sections 49, 50. The output sections 51, 52, 53, 54 and 55 apply necessary control signals to the units including the alphanumeric display 27 and the progession display 28. More precisely, the output sections 52, 53, 54 and 55 apply their output signals to a decoder 57 as shown in FIG. 6. The output signals of the decoder 57 are applied to the alphanumeric display 27 or the progression display 28 after being amplified by a driver 58 as shown in FIG. 6. The output signals of the input/output sections 49 and 50 are used to control the water feed valve 32, the drain valve 13 and the drive unit 7.

FIG. 7 shows the external appearance of the control device 37 together with an arrayed pattern of its terminals. The signal terminals 120 and 141 are connected to a power supply driving the control device 37. The signal terminals 137 to 140 and the signal terminals 133 to 136 are connected to the input sections 47 and 48 respectively. The signal terminals 108 to 111 and the signal terminals 102 to 105 are connected to the input/output sections 49 and 50 respectively. The signal terminals 112 to 115, the signal terminals 116 to 119, the signal terminals 122 to 125, the signal terminals 126 to 129, and the signal terminals 130 to 132 are connected to the output sections 51 to 55 respectively. The signal terminals 101 and 142 are connected to the CG 46. The signal terminal 106 is connected to a source of an interrupt processing request input signal. The signal terminal 107 is connected to a source of a reset input signal. The signal terminal 120 is connected to a source of a test signal used for testing the control device 37.

As described hereinbefore, the liquid level in the outer tub 4 can be selectively set at one of a low level $H_1$ (=6 liters), a medium level $H_2$ (=30 liters) and a high level $H_3$ (=37 liters) by means of the water level selection knob 20. These water levels $H_1$, $H_2$ and $H_3$ are sensed by the pressure switch 34. More precisely, the output signal level of the pressure switch 34 is changed over from its high level to its low level when the water level drops down to a level $L_0$ at which water is almost completely drained. During a filling operation, however, the output signal of the pressure switch 34 is changed over from its low level to its high level when water is filled up to one of the water levels $H_1$, $H_2$ and $H_3$.

A practical example of the operation program selected by the button switch $S_1$ of the automatic operation program selector switch array 22 is illustrated in FIG. 9. This selected operation program comprises a washing operation including a filling step and an agitating step; a spinning/rinsing operation including a draining step, a first intermittent spinning step, a showering/spinning step and a second intermittent spinning step; a feeding/rinsing operation including a filling step and a feeding/agitating step; and a spinning operation including a draining step and a continuous spinning step. The term "agitating" is used herein to denote the step in which the articles to be washed contained within the washing and spinning basket tub 5 are agitated together with water by the agitating action of the rotating pulsator 6 with the basket tub 5 being held stationary. The term "intermittent spinning" is used herein to denote the step in which the electric motor 8 is intermittently driven in the completely drained state of the outer tub 4, and the rotating speed of the basket tub 5 is progressively increased. The term "showering/spinning" is used herein to denote the step in which the washing and spinning basket tub 5 is rotated in the completely drained state of the outer tub 4 while feeding water from the shower head 33. The term "feeding/agitating" is used herein to denote the step in which the electromagnetic drain value 13 is closed, and the pulsator 6 only is rotated while continuously feeding water from the shower head 33 into the outer tub 4 to cause an overflow of water from the overflow port 4b. The term "continuous spinning" is used herein to denote the step in which the washing and spinning basket tub 5 is continuously rotated in the completely drained state of the outer tub 4. The duration of the agitating step in the washing operation is set at 10 minutes in this operation program. The durations of the first and second intermittent spinning steps in the spinning/rinsing operation are set at 2.5 minutes and 2.5 minutes respectively. The duration of the continuous spinning step in the spinning operation is set at 5 minutes in this operation program. These durations are compiled in the operation program stored in the ROM 38.

The duration T of the filling step in the washing operation, the duration $t_{1a}$ of the filling step in the feeding/rinsing operation, the duration $t_2$ of the draining step in the spinning/rinsing operation, the duration $t_{2a}$ of the draining step in the spinning operation, the duration $T_1$ of the showering/spinning/step in the spinning/rinsing operation, and the duration of the feeding/agitating step in the feeding/rinsing operation will vary depending on the conditions including the filling and draining capacities and cannot thus be definitely determined. Therefore, the length of time T required for filling the outer tub 4 up to one of the predetermined water levels in the initial filling step, i.e. the length of time T required for the changeover of the output signal of the pressure switch 34 from the low level to the high level is measured, and on the basis of this measured length of time T, necessary computations are carried out in the control device 37 to determine the duration $T_1$ of the showering/spinning step in the spinning/rinsing operation, the duration $t_{1a}$ of the filling step in the feeding/rinsing operation and the duration $T_3$ of the feeding/agitating step in the feeding/rinsing operation. Further, the length of time $t_2$ required for the complete draining of water from the outer tub 4 in the initial draining step, i.e. the length of time $t_2$ required for the change-over of the output signal of the pressure switch 34 from its high level to its low level is measured, and on the basis of this measured length of time $t_2$, necessary computations are carried out in the control device 37 to determine the duration $t_{2a}$ of the draining step in the spinning operation. The data of these durations T, $t_2$, $t_{1a}$, $t_{2a}$, $T_1$ and $T_3$ are stored in the RAM 39.

Figure 10:
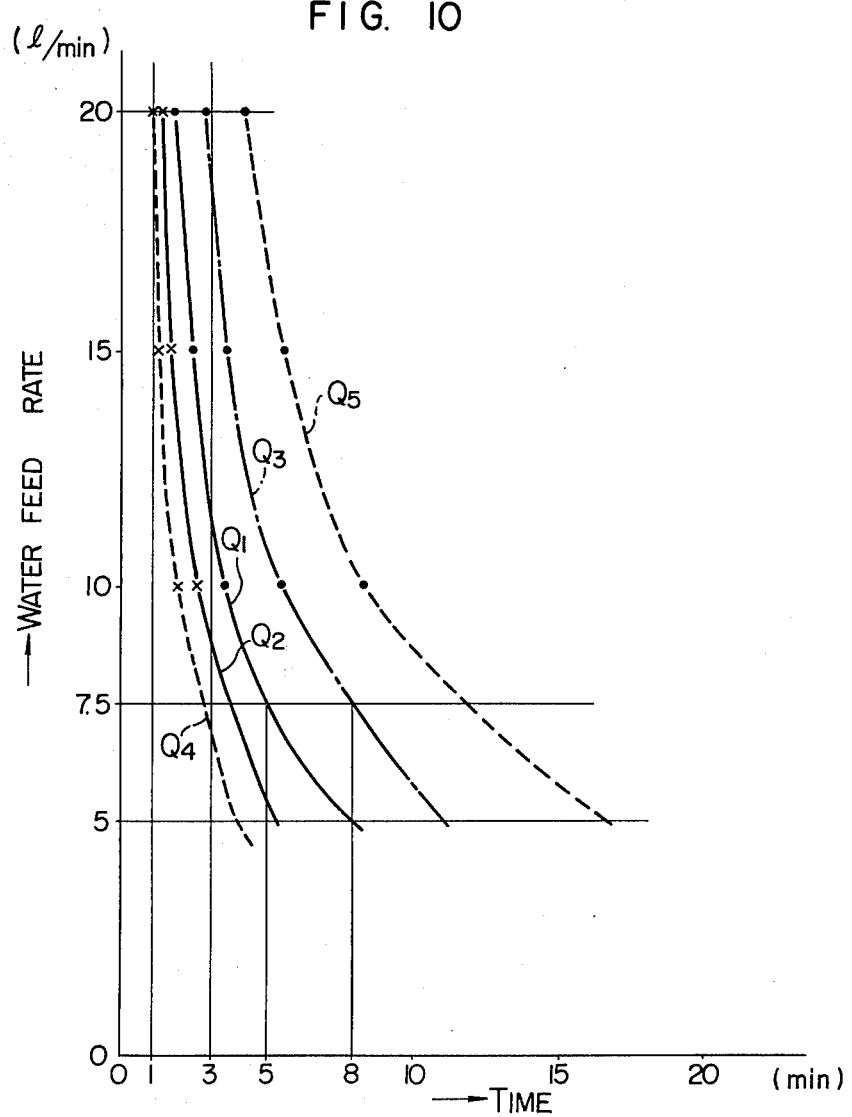
FIG. 10 is a graph showing the relation between the water feed rate and the length of time required for filling the tub up to a plurality of predetermined levels.

The length of time T required for filling the outer tub 4 in the initial filling step varies depending on the feed rate (l/min) of water supplied from the available source of water supply. The relation between this required length of time T and the water feed rate is illustrated in FIG. 10. The curve $Q_1$ in FIG. 10 represents the filling characteristic when water is filled up to the high water level $H_3$ in the outer tub 4, and the curve $Q_2$ represents the filling characteristic when water is filled up to the low water level $H_1$. The curve $Q_3$ represents the filling characteristic when the "standard rinsing" operation is carried out with water filled up to the high water level $H_3$, and the curve $Q_4$ represents the filling characteristic when an "economy rinsing" operation is carried out with water filled up to the low water level $H_1$. The curve $Q_5$ represents the filling characteristic when the "strong rinsing" operation is carried out with water filled up to the high water level $H_3$.

It will be seen from the characteristic curve $Q_1$ shown in FIG. 10 that the length of time T required for filling the outer tub 4 up to the high water level $H_3$ varies in the range of 1.8 minutes to 7.4 minutes. In the case of the characteristic curve $Q_2$, the length of time T required for filling the tub 4 up to the low water level $H_1$ varies in the range of 1.3 minutes to 5.3 minutes. It has been experimentally confirmed that the duration $T_1$ of the showering/spinning step in the spinning/rinsing operation is preferably selected to be $\frac{1}{4}$ of the length of time T required for filling the tub 4 up to the desired level in the initial filling step, in order to satisfactorily attain the effect of the spinning/rinsing action. It has also been experimentally established that the duration $T_3$ of the feeding/agitating step in the feeding/rinsing operation is preferably selected to be 1.5 times the length of time T required for filling the tub 4 up to the desired level in the initial filling step, in order to satisfactorily exhibit the effect of the feeding/rinsing action. Accordingly, when the showering/spinning duration $T_1$ is selected to be $\frac{1}{4}$ of the required filling length of time T, this duration $T_1$ will vary in the range of 0.45 minutes to 1.85 minutes when the desired water level is $H_3$, and will vary in the range of 0.33 minutes to 1.33 minutes when the desired water level is $H_1$. On the other hand, when the feeding/agitating duration $T_3$ is selected to be 1.5 times the required filling length of time T, the duration $T_3$ will vary in the range of 2.7 minutes to 11.1 minutes when the desired water level is $H_3$, and will vary in the range of 1.95 minutes to 7.95 minutes when the desired water level is $H_1$.

As can be seen from the filling characteristic curves $Q_1$ and $Q_2$ shown in FIG. 10, the water feed rate will be more than 7.5 liters per minute when the required filling length of time T is shorter than about 5 minutes, while the water feed rate will be less than 5 liters per minute when the required filling length of time T is longer than about 8 minutes. The automatic washing machine of the present invention shown in FIG. 1 is designed so that it can operate with a standard water feed rate of 7.5 liters per minute and it can also satisfactorily operate with a minimum water feed rate of 5 liters per minute.

Time settings $T_0 = 8$ minutes and $T_4 = 5$ minutes are employed as the data for determining the water feed capacity of the available source supplying water to the automatic washing machine shown in FIG. 1. The length of time T actually required for filling the tub 4 in the filling step of the washing operation is measured to be compared with the time settings $T_0$ and $T_4$ in the control device 37 so as to find the water feed capacity of the water supply source during actual use. Thus, when it is proved that $T \leq T_0$, the actual water feed rate of the water supply source is determined to be equal to or less than 5 liters per minute, while when the relation $T \geq T_4$ holds, the actual water feed rate is determined to be equal to or more than 7.5 liters per minute.

Further, another time setting $T_5 = 1$ minute is employed as the data for finding such an abnormal water feed condition in which water is filled in the tub 4 within an abnormally short length of time. The length of time T actually required to fill the tub 4 in the filling step of the washing operation is measured to be compared with this time setting $T_5$, and when the relation $T \leq T_5$ holds, it is determined that an abnormal water feed condition has occurred. In such a case, another time setting $T_7$ stored in the ROM 38 is read out to replace the measured required filling length of time $T_1$ and the showering/spinning duration $T_1$ in the spinning/rinsing operation and the feeding/agitating duration $T_3$ and the filling duration $T_{1a}$ in the feeding/rinsing operation are determined on the basis of the above time setting $T_7$ read out from the ROM 38. In the illustrated embodiment, this time setting $T_7$ is experimentally determined and selected to be 3 minutes. The values of these time settings $T_0$, $T_4$, $T_5$ and $T_7$ are stored in the ROM 38.

The water feeding duration $T_2$ in the "strong" rinsing operation is preferably selected to be 1.5 times the feeding/agitating duration $T_3$, and this water feeding duration $T_2$ in the "economy" rinsing operation is preferably selected to be 0.5 time the feeding/rinsing duration $T_3$. On the other hand, the water feeding duration $T_2$ in the "standard" rinsing operation is preferably selected to be equal to the feeding/agitating duration $T_3$. These constants, 0.5 and 1.5, for setting the water feeding durations $t_2$ in the "strong" and "economy" rinsing operations respectively are stored in the ROM 38.

When the required filling duration T in the initial filling step is longer than the time setting $T_0 = 8$ minutes, the progression display 28 provides a flickering display to indicate occurrence of such an abnormal water feeding condition in which water is not sufficiently supplied from the source of water supply. Also, when the required filling duration T in the initial filling step exceeds this time setting $T_0$, the buzzer is energized to inform the operator of the fact that water is not sufficiently supplied from the source of water supply. In response to the generation of the alarm signal from the buzzer, the water feed system 30 is shut down. After the removal of the source of such an abnormal water feeding condition in the initial filling step, the water feed system 30 is reactivated by a manual resetting means thereby to re-start the filling step. Comparison of the actual initial filling duration T with the time settings $T_0$ and $T_4$ is performed in the control device 37. The control device 37 generates necessary instruction signals for displaying occurrence of the abnormal water feeding condition, for informing the operator of occurrence of the abnormal water feeding condition and for deenergization or reactivation of the water feed system 30.

Referring to FIG. 2 again, duration changing switch arrays 59, 60 and 61 are disposed above the progression display 28 on the console panel 16c. The first duration changing switch array 59 comprises a pair of button switches 59a and 59b for changing the duration of the agitating step in the washing operation. The second duration changing switch array 60 comprises a pair of button switches 60a and 60b for changing the duration of the intermittent spinning steps in the spinning/rinsing operation. The third duration changing switch array 61 comprises a pair of button switches 61a and 61b for changing the duration of the continuous spinning step in the spinning operation. The signals generated by selective depression of these button switches 59a, 59b, 60a, 60b, 61a and 61b are applied to the control device 37 to be identified by the ALU 42 so that the durations of the agitating step, intermittent spinning steps and continuous spinning step in the operation program can be changed as selected. In FIG. 2, arrows directing toward the left are affixed to the button switches 59a, 60a and 61a to indicate that they are depressed for extending the corresponding durations, while arrows directing toward the right are affixed to the button switches 59b, 60b and 61b to indicate that they are depressed for shortening the corresponding durations.

For example, the duration of the agitating step in the washing operation is increased by 2 minutes each time the button switch 59a is depressed, and this duration is decreased by 2 minutes each time the button switch 59b is depressed. The duration of the agitating step in the washing operation is so set that one of 10 minutes, 8 minutes, 4 minutes and 2 minutes can be selected as desired. The duration of the intermittent spinning steps in the spinning/rinsing operation is set at 2.5 minutes in response to the depression of the button switch 60a, and this duration is set at 2 minutes in response to the depression of the button switch 60b. The duration of the continuous spinning step in the spinning operation is increased by 2 minutes each time the button switch 61a is depressed, and this duration is decreased by 2 minutes each time the button switch 61b is depressed. The duration of the continuous spinning step in the spinning operation is so set that one of 5 minutes, 3 minutes and 1 minute can be selected as desired.

An operation program selected by the selective depression of the button switches of the automatic operation program selector switch array 22 and operation selector switch array 23 is displayed by the energization of the corresponding display lamps of the progression display 28 on the console panel 16c. With the progression of the selected operation program, the display lamps corresponding to the finished steps are progressively deenergized so that the remaining steps can be easily visually confirmed. In order to facilitate visual confirmation of the progression of the selected operation program, a contrivance is made on the console panel 16c. More specifically, the twelve display lamps $L_1$ to $L_{12}$ constituting the progression display 28 are disposed in a horizontal row above the display bar zone 29 on the console panel 16c. Further, the words "washing", "rinsing" and "spinning" are printed above the twelve display lamps $L_1$ and $L_{12}$ constituting the progression display 28 so that the washing operation, rinsing operation and spinning operation can be readily identified.

In response to the selective depression of the button switches of the automatic operation program selector switch array 22 and operation selector switch array 23 on the console panel 16c, a selected operation program is read out from the ROM 38. Further, in response to the selective depression of the button switches 59a to 61b of the duration changing switch arrays 59, 60 and 61, corresponding output signals appear therefrom. Lamp energizing signals are applied from the control device 37 to the progression display 28 through the output sections 52, 53, 54 and 55 to energize the selected ones of the display lamps $L_1$ to $L_{12}$ of the progression display 28.

The filling operation of the automatic washing machine having the aforementioned construction will be described in more detail. At first, the main switch 21 is turned on, and then, the buzzer sound level selection knob 19 and the water level selection knob 20 are set at the desired positions or marks. Subsequently, the button switches of the automatic operation program selector switch array 22 and the operation selector switch array 23 are selectively depressed to select an operation program desired by the operator.

The output signals of the selected button switches of the switch arrays 22 and 23 are applied through the input sections 48, 49 and 50 to the ALU 42 of the control device 37, and the ALU 42 identifies these input signals to apply a command signal to the PC 40 for access to the address of the selected operation program stored in the ROM 38. In response to the application of the address signal from the PC 40, the selected operation program stored in the ROM 38 is read out from the ROM 38 to be supplied to the ALU 42, and the corresponding command signal is applied from the ACC 43 to the output sections 52, 53, 54 and 55. When, for example, the button switch $S_1$ of the automatic operation program selector switch array 22 is depressed, all of the twelve display lamps $L_1$ to $L_{12}$ of the progression display 28 are energized, and the letter "P" is displayed on the alphanumeric display 27 to inform the operator of the fact that the selected operation program is not started yet.

Then, in response to the depression of the start switch 24 for starting the selected operation program, the letter "P" displayed on the alphanumeric display 27 disappears by the action of the ALU 42, and a numeric display, for example, "28 minutes" is now displayed on the alphanumeric display 27. At the same time, the input/output sections 49 and 50 provide an output signal to open the electromagnetic feed valve 30 to start the filling step of the washing operation.

When water fed through the opened feed valve 30 is filled in the tub 4 up to the selected predetermined level, for example, the high water level $H_3$ selected by the water level selection knob 20, the output signal of the pressure switch 34 is changed over from its low level to its high level.

The length of time T required until the high-level output signal appears from the pressure switch 34 after the starting of the filling step is measured, and this data T is stored in the RAM 39.

However, no water would flow into the tub 4, and the tub 4 would not be filled up to the desired water level even after a considerable length of time has elapsed if the failure of water supply such as a suspension or freezing occurs in the water supply conduit or the operator perates the washing machine while forgetting to open the cock of the water supply conduit during the filling step. The same applies to the case in which the drain system 18 including the drain valve 13 is not sufficiently sealed against leakage, and the amount of drain exceeds the amount of feed.

In the event of occurrence of such a trouble or an abnormal filling condition, a water feed stop signal appears from the control device 37 to close the feed valve 30 and to cause flickering of the display lamps of the progression display 28 on the console panel 16c. More precisely, a flickering signal is applied from the output sections 52, 53, 54 and 55 to the progression display 28 to cause flickering of the display lamps when the ALU 42 judges that the relation $T_4 \leq T$ holds after comparing the measured actual filling length of time T with the time settings $T_0$ and $T_4$ read out from the ROM 38. Further, when the ALU 42 judges that the relation holds $T_0 \leq T$ in the course of the filling step, an operation stop signal and an abnormality alarm signal appear from the input/output sections 49 and 50 to stop the operation of the water feed system 30 and to energize the buzzer thereby to inform the user of occurrence of an abnormal filling condition.

After the source of the filling trouble or abnormal filling condition has been remedied, a reset signal is applied to the signal terminal 107. In response to the application of the reset signal to the signal terminal 107, an actuating signal for actuating the water feed system 30 appears from the control device 37 to re-start the filling operation by the water feed system 30. When the filling step proceeds normally and water is filled up to the desired predetermined level in the outer tub 4, the high-level output signal of the pressure switch 34 is applied to the input sections 47 and 48. A filling stop signal appears from the input/output sections 49 and 50 to stop the operation of the water feed system 30, and at the same time, the ALU 42 compares the measured actual filling length of time T with the time setting $T_5$. When the result of comparison proves that $T < T_5$, the time setting $T_7 = 3$ minutes stored in the ROM 38 is read out to replace the measured actual filling length of time T, and on the basis of this time setting $T_7$, the duration $T_1$ of the showering/rinsing step in the spinning/rinsing operation, the duration $T_{1a}$ of the filling step in the feeding/rinsing operation and the duration $T_3$ of the feeding/agitating step in the feeding/rinsing operation are determined. These values of $T_1$, $T_{1a}$ and $T_3$ are stored in the RAM 39. On the other hand, when the result of comparison between the measured actual filling length of time T and the time setting $T_5$ in the ALU proved that $T \geq T_5$, the duration $T_1$ of the showering/spinning step in the spinning/rinsing operation, the duration $T_{1a}$ of the filling step in the feeding/rinsing operation and the duration $T_3$ of the feeding/agitating step in the feeding/rinsing operation are determined on the basis of the measured value of T, and these values of $T_1$, $T_{1a}$ and $T_3$ are stored in the RAM 39.

In response to the application of the high-level output signal of the pressure switch 34 to the input sections 47 and 48 after the washing operation, a drain start signal appears from the input/output sections 49 and 50 to actuate the drain system 18 thereby starting the draining step of the spinning/rinsing operation. The output signal of the pressure switch 34 is changed over to its low level from its high level when the water level in the outer tub 4 is lowered to the level $H_0$ with the draining of water. In response to the application of this low-level output signal of the pressure switch 34 to the input sections 47 and 48, a drain stop signal appears from the input/output sections 49 and 50 to stop the operation of the drain system 18. The length of time elapsed until the output signal of the pressure switch 34 is changed over from its high level to the low level is computed by the ALU 42, and this value is stored in the RAM 39 as the duration $t_2$ of the draining step in the spinning/rinsing operation. The duration $T_{2a}$ of the draining step in the spinning operation is determined on the basis of this value of $t_2$. These values of $t_2$ and $t_{2a}$ are stored in the RAM 39.

The values of $T_1$, $t_{1a}$, $T_3$, $t_2$ and $t_{2a}$ are successively read out from the RAM 39 according to the programmed operation sequence of the selected operation program read out from the ROM 38 so that the rinsing operation and spinning operation can be carried out according to the selected operation program.

Figure 11:
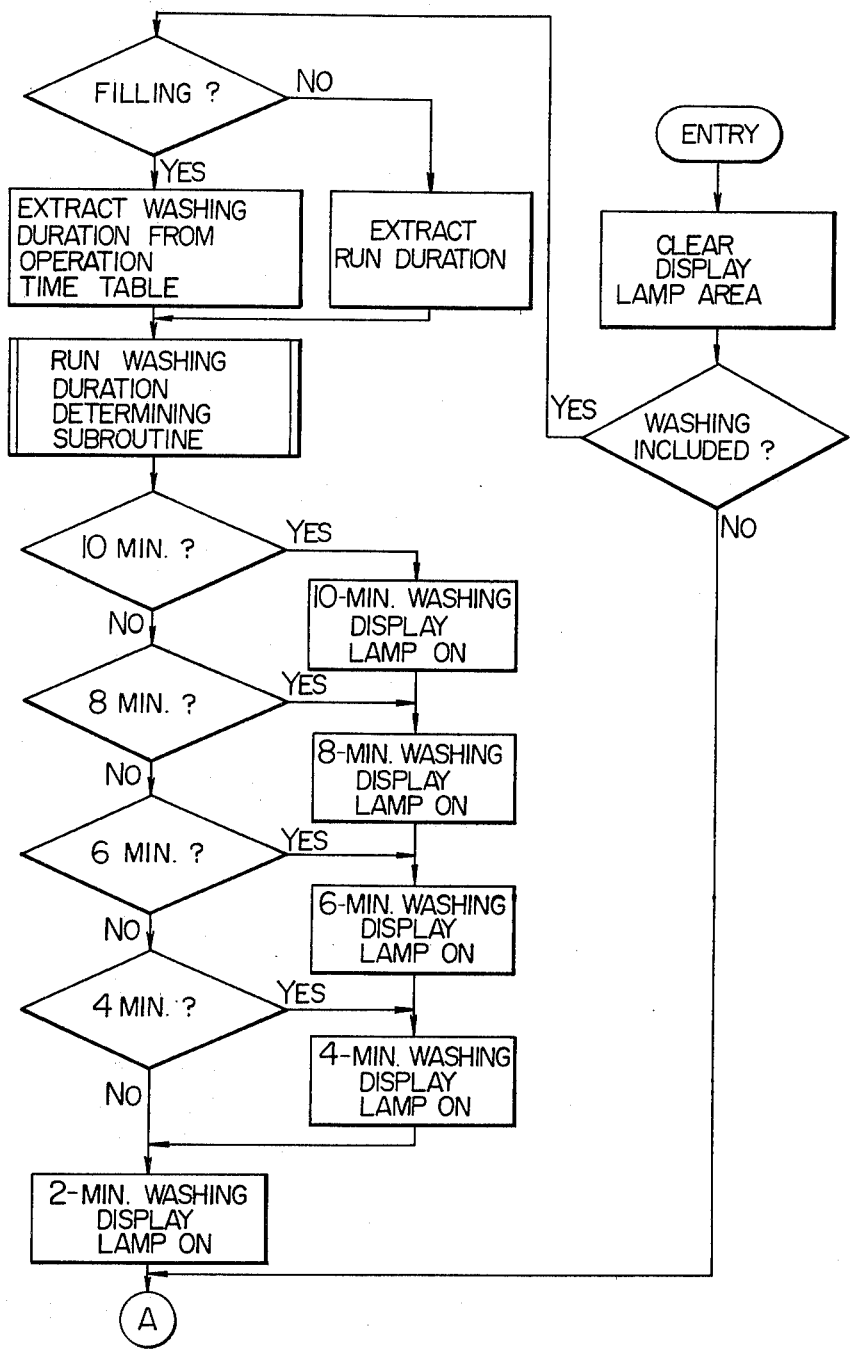
FIG. 11 is a flow chart showing a manner of displaying the progression of a washing operation by a progression display disposed on the console panel shown in FIG. 2.

The display mode of the display lamps of the progression display 28 will be described in more detail with reference to a flow chart shown in FIGS. 11 to 13. Referring first to FIG. 11 showing the flow chart portion associated with the washing operation, the block "ENTRY" designates the flow of the data which have been processed in the control device 37 for providing the selected display pattern. The term "DISPLAY LAMP AREA" designates the terminals of the driver 58 which are selected for energizing the selected display lamps of the progression display 28.

At first, the display lamp area of the ROM 38 is cleared so as to avoid re-use of the display lamp information used in the previous machine operation.

Then, judgement is made as to whether the cycle selected by the operation selector switch array 23 includes a washing operations or not. When the result of judgement proves that no washing operation is included in the selected cycle, the step proceeds to (A). When, on the other hand, the result of judgement proves that the selected cycle includes a washing operation, judgement is then made as to whether water is being fed to fill the outer tub 4.

In this case, the answer is "YES" since the filling step in the washing operation of the selected operation program is just started. Then, the duration of the agitating step in the washing operation is extracted from the operation time table. That is, in response to the application of the corresponding input to the ROM 38, the preset duration of the agitating step in the washing operation is extracted from the predetermined operation time table of the selected operation program stored in the ROM 38.

On the other hand, the answer is "NO" when the agitating step in the washing operation has been started with water filled up to the desired predetermined level in the tub 4. In this case, the run duration of the agitating step is extracted from the RAM 39.

Then, an agitating duration determining subroutine is run for determining the agitating duration of the washing operation independently of the main routine by processing the inputs applied to the control device 37 from the automatic operation program selector switch array 22 and duration changing switch array 59.

When the determined duration of the agitating step in the washing operation is 10 minutes, all of the five display lamps $L_1$ to $L_5$ provided for indicating the durations of 10 minutes, 8 minutes, 6 minutes, 4 minutes and 2 minutes respectively are energized.

When, on the other hand, the determined duration of the agitating step in the washing operation is 8 minutes, the four display lamps $L_2$ to $L_5$ are energized. Similarly, the three display lamps $L_3$ to $L_5$, the two display lamps $L_4$ and $L_5$, and the single display lamp $L_5$ are energized when the above duration is 6 minutes, 4 minutes and 2 minutes respectively.

The display lamps are successively deenergized with the lapse of time at intervals of 2 minutes to indicate the remaining run time by the varying number of the display lamps kept energized.

Referring next to FIG. 12 showing the flow chart portion associated with the rinsing operation, judgment is first made as to whether a rinsing operation is included in the cycle selected by the operation selector switch array 23. When the result of judgement proves that no rinsing operation is included in the selected cycle, the step proceeds to (B). When, on the other hand, the result of judgment proves that the selected cycle includes a rinsing operation, judgment is then made as to whether or not the showering/rinsing step, which is necessarily carried out as the first step of the rinsing operation, has been completed. This showering/rinsing step is naturally carried out as the first step of the rinsing operation, and the showering/rinsing display lamp $L_6$ is energized.

The next step is filling the outer tub 4 with water for carrying out the rinsing operation in the tub 4 filled with water. Judgment is made as to whether water is being fed to fill the tub 4 for carrying out the rinsing operation. When the result of judgment proves that the washing operation is still being carried out or water is still being filled in the tub 4, that is, the rotation of the pulsator 6 for the rinsing function does not still take place, the filling and feeding duration is extracted from the operation time table in a manner entirely similar to that described for the washing operation. When, on the other hand, the result of judgment proves that the filling step has been completed, the run duration is extracted from the RAM 39 in a manner entirely similar to that described for the washing operation.

A rinsing duration determining subroutine is then run for determining whether the rinsing duration is long or short, that is, "strong" or "standard".

When the determined rinsing duration is "strong", all of the remaining three display lamps $L_7$, $L_8$ and $L_9$ indicating "strong" rinsing, "standard" rinsing and "economy" rinsing respectively are energized. When, on the other hand, the two display lamps $L_8$ and $L_9$ are energized in the case of the "standard" rinsing, and the display lamp $L_9$ indicating the "economy" rinsing is solely energized in any other cases. These display lamps $L_6$ to $L_9$ are energized to represent the selected rinsing operation and are successively deenergized with the progression of the rinsing operation.

The rinsing duration is selected to become shorter in the order of "strong", "standard" and "economy". However, any practical numerical values of the rinsing duration will not be described herein since the rinsing duration varies depending on the water feed rate.

FIG. 13 shows the flow chart portion associated with the spinning operation. Referring to FIG. 13, judgment is also made as to whether the selected cycle includes a spinning operation or not. When the result of judgment proves that no spinning operation is included in the selected cycle, all of the display lamps $L_{10}$ to $L_{12}$ assocaited with the spinning operation are not energized, and the step proceeds to "RETURN". On the other hand, when the result of judgment proves that the selected cycle includes a spinning operation, judgment is then made as to whether or not the draining step has been completed. The spinning duration is extracted from the operation time table when the washing or rinsing operation is being carried out or when water is being drained prior to the spinning step, while the run duration is extracted from the RAM 39 when the spinning operation is being carried out after the draining step.

A spinning duration determining subroutine is then run to determine the spinning duration. When the determined spinning duration is 5 minutes, all of the three display lamps $L_{10}$, $L_{11}$ and $L_{12}$ indicating 5 minutes, 3 minutes and 1 minute respectively are energized. On the other hand, the two display lamps $L_{11}$ and $L_{12}$ are energized when the determined spinning duration is 3 minutes, and the display lamp $L_{12}$ is solely energized when the determined spinning duration is 1 minute.

According to the above manner of progression display shown in FIGS. 11, 12 and 13, the display lamps $L_1$ to $L_{12}$ are selectively energized to indicate the run durations of the washing, rinsing and spinning operations selected by the operation selector switch array 23 so that the operator who is a housewife can readily identify the operation program selected by herself.

Since the display lamps corresponding to the operation or operations already carried out are successively deenergized with the lapse of time and the display lamps corresponding to the remaining operation or operations are kept energized so that the progression of the machine operation can be readily seen at a glance on the console panel 16c. Thus, the operator who is a housewife can very readily identify the run durations of the washing, rinsing and spinning operations, either long or short, by looking the number of the display lamps which are kept energized to display such durations.

FIG. 14 illustrates the display mode of the display lamps displaying the progression of the washing operation, the rinsing operation and/or the spinning operation selected by selective depression of the button switches $S_1$ to $S_6$ of the automatic operation program selector switch array 22 and the button switches I to V of the operation selector switch array 23. In FIG. 14, white dots indicate the display lamps which are not energized, and hatched dots indicate those which are energized. Although some representative examples of the combinations of the washing, rinsing and spinning operations are illustrated in FIG. 14, it is apparent that various other combinations can be realized by the selective depression of the six button switches $S_1$ to $S_6$ of the automatic operation program selector switch array 22 and the five button switches I to V of the operation selector switch array 23. As described already with reference to FIG. 3, the durations of the washing, rinsing and spinning operations in each cycle can be selected to be long or short as desired, and the water feed rate is also included as a factor for determining such durations in each cycle.

The subroutines prepared to display the progression of the washing, rinsing and spinning operations of the operation programs selected by the selective depression of the button switches are stored in the ROM 38 according to the rule shown in the flow chart of FIGS. 11, 12 and 13. These subroutines are called out from the main routine as required to energize the selected display lamps of the progression display 28 according to the display mode shown in the flow chart and are then returned to the main routine.

A mid-course modification of a selected operation program may be required by the operator who desires to interrupt, extend or alter the operation program during the progression of the machine operation. Such a mid-course modification will be described with reference to a flow chart shown in FIGS. 15 and 16.

Figure 15:
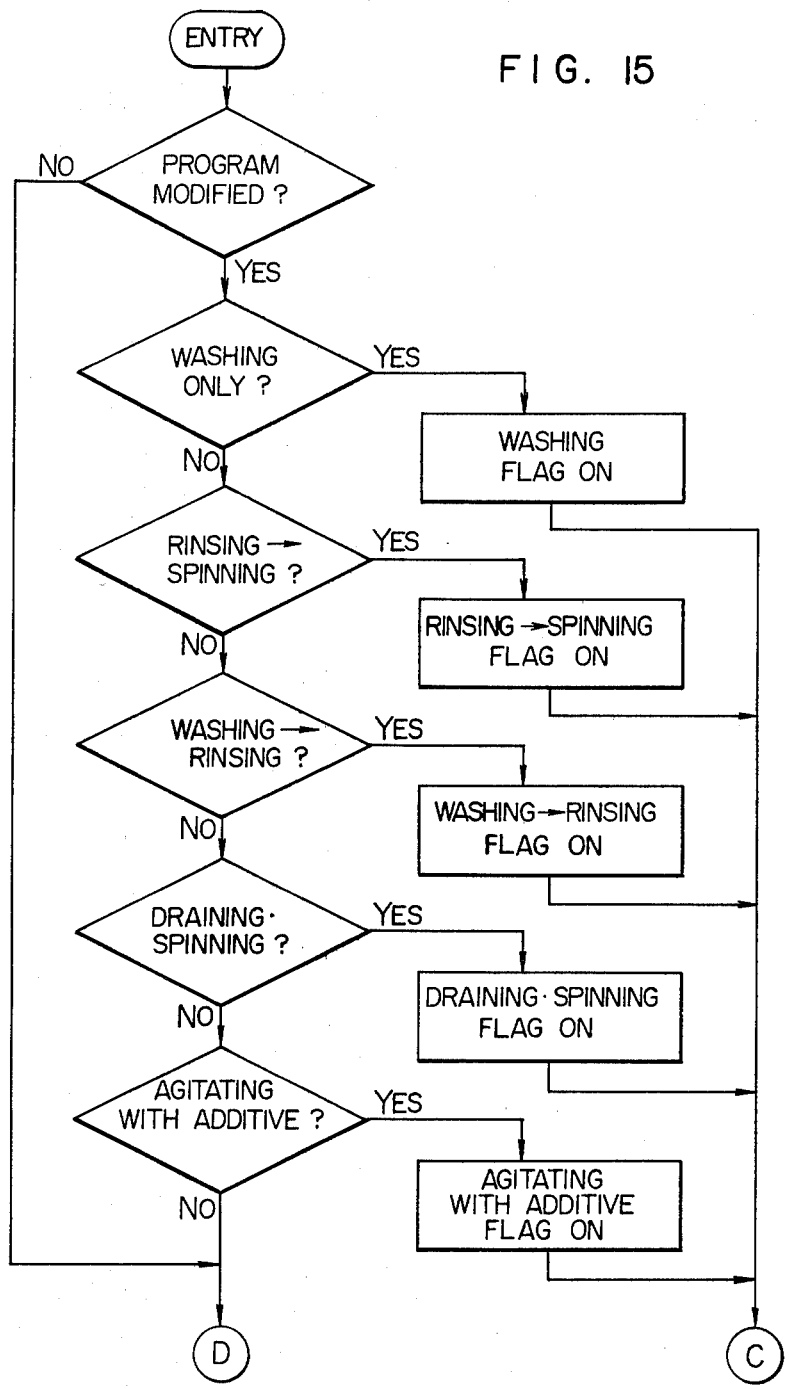
FIGS. 15 and 16 is a flow chart of operations carried out to conform to a modification of an already selected operation program.
Figure 16:
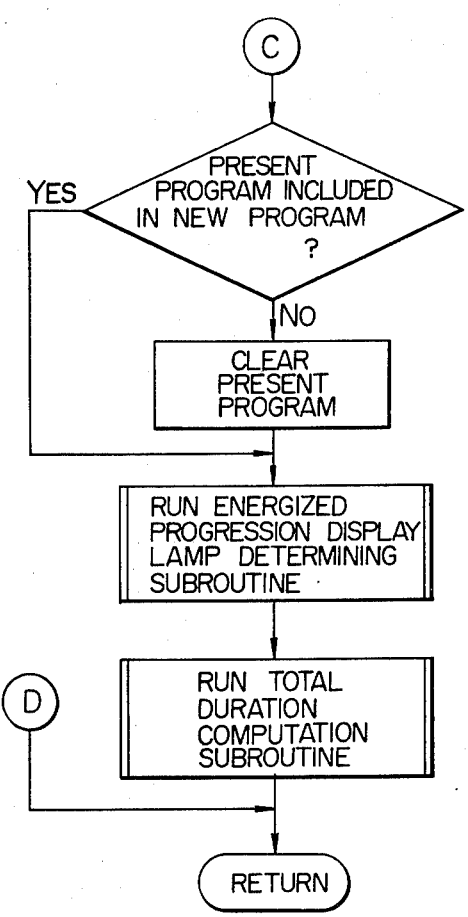

Entry of this routine starts processing according to the flow chart shown in FIGS. 15 and 16. At first, judgment is made as to whether or not a mid-course modification of a selected operation program is required by the operator. When the result of judgment proves that such a mid-course modification is required by the operator who depresses one of the button switches I to V of the operation selector switch array 23, the corresponding flag register in the register area of the RAM 39 is turned on. It will be seen in FIG. 15 that a "washing" flag register is turned on when the modified operation program includes the washing operation only. A "rinsing→spinning" flag registor is turned on when the modified operation program includes the rinsing operation followed by the spinning operation. A "washing→rinsing" flag register is turned on when the modification includes the washing operation followed by the rinsing operation. A "spinning" (draining and continuous spinning) flag registor is turned on when the modification includes the spinning operation in which continuous spinning is carried out after draining. An "agitation with additive" flag register is turned on when the modification includes the agitating operation using a finishing agent.

In the flow chart portion shown in FIG. 16, the newly selected operation program (referred to hereinafter as a new operation program) is compared with the already selected operation program (referred to hereinafter as a present operation program).

When the present operation program includes an operation included in the new operation program, the length of time already elapsed is computed according to the display lamp energization subroutines shown in FIGS. 11 to 13, and the operation included in the present operation program is carried out for the remainder of its duration.

When the present operation program does not include any of the operations of the new operation program, the present operation program is cleared, and the display of the new operation program by the display lamps is started according to the display lamp energization subroutines.

Depending on the degree of the modification of the operation program, the total length of time required for carrying out all the operations of the new operation program is re-computed according to a total duration computation subroutine prior to the entry of the main routine.

The flow chart shown in FIGS. 15 and 16 illustrates the manner of processing for the display of progression of the new operation program. It is to be understood that, besides the above processing, necessary processing for the operations of the new operation program is carried out concurrently so that the display of the new operation program by the display lamps matches completely with the operation sequence of the new operation program.

FIG. 17 illustrates some practical examples of mid-course modifications of an operation program. Referring to FIG. 17, the mode $X_1$ represents the state of display by the progression display lamps immediately after the starting of the standard cycle.

The mode $X_2$ represents the state of display after the washing operation has been carried out for 2 minutes with the tub 4 filled with water up to the predetermined level.

The mode $X_3$ represents the state of display when the operator depresses the pause switch 25 in the course of the operation represented by the mode $X_2$ and then depresses the button switch I of the operation selector switch array 23.

The mode $X_4$ represents the state of display when the operator charges her mind and depresses the button switch III of the operation selector switch array 23.

The mode $X_5$ represents the state of display when the operator depresses then the start switch 24, and the rinsing operation starts after the washing operation.

The mode $X_6$ represents the state of display when, immediately after the starting of the rinsing operation shown in the mode $X_5$, the operator changes her mind again and depresses the pause switch 25 and then the button switch II of the operation selector switch array 23 as she wishes to extend the operation program to include the spinning operation.

The mode $X_7$ represents the state of display when the operator depresses the start switch 25 in the mode $X_6$ and the rinsing operation is proceeding.

The mode $X_8$ represents the state of display when the operator depresses the pause switch 25 again and then depresses the button switch III again as she recalls a task to be done urgently.

The mode $X_9$ represents the state of display when the operator returns the home after having finished her task and depresses the button switch IV after turning on the start switch 25.

The mode $X_{10}$ represents the state of display when the operator depresses the pause switch 25 as she judges that the spinning operation continued for 4 minutes is sufficient for the spinning purpose.

The mode $X_{11}$ represents the state of display when the operator depresses then the button switch III again to start a second sequence of operations.

It will be understood from the foregoing detailed description of the present invention that, when the operator depresses one of the button switches of the operation selector switch array 23 in the course of execution of an already selected operation program to modify the present operation program, the new operation program is compared with the present operation program in the control device 37 which checks as to whether a common operation is included in the new operation program, and the machine operation is continued or discontinued on the basis of the result of check. Thus, a mid-course modification of the present operation program in the course of carrying out all the operations ranging from the washing operation to the spinning operation can be sufficiently satisafctorily attained to meet the request of the operator.

The automatic washing machine according to the present invention is advantageous over prior art machines of this kind in that it is more efficiently usable and it can display the progression of an operation program in a way readily identified by the operator, as will be readily apparent from comparison with the prior art automatic washing machines in which the considerations as those of the present invention are not taken, and for example, a present operation program is necessarily entirely replaced by a new operation program when the new operation program is requested, or such a new operation program is rejected when the present operation program is being executed.

It is an additional advantage of the present invention that the progression display lamps are selectively energized in response to the selective depression of the button switches of the operation selector switch array 23 for the purpose of modifying the present operation program and clearly display the operations to be carried out, so that the operator can readily visually identify the operations included in the new operation program selected by herself.

It will be apparent from the foregoing detailed description that the present invention provides an efficiently usable automatic washing machine and a method for operating such a machine.

What we claim is:

1. An automatic washing machine comprising a cabinet, an outer tub supported within said cabinet, a spinning and washing perforated tub supported rotatably within said outer tub, a rotatable agitator agitating articles to be washed together with water filled within said spinning and washing tub, drive means for driving said rotatable agitator during a washing operation and a rinsing operation and driving said spinning and washing tub during a spinning operation, a water feed system feeding water into said outer tub, a water drain system draining water from within said outer tub, memory means for programming and storing the operating durations and the operating sequence of said drive means, said feed system and/or said drain system, means for selecting a desired operation program from those stored in said memory means, and control means for controlling said drive means, said feed system and/or said drain system in accordance with the operation program selected by said selecting means thereby carrying out the programmed sequence of the washing, rinsing and spinning operations, said selecting means including operation selector switch means for selecting the combination of the washing operation, the rinsing operation and/or the spinning operation in the selected operation program as desired and also for making a mid-course modification of the already selected operation program, wherein said control means comprises means for comparing a newly selected operation program with the already selected operation program whereby, when the already selected operation program includes an operation included in the newly selected operation program, the operation in the already selected program corresponding to that included in the newly selected operation program is only continuously carried out for the predetermined run duration.

2. An automatic washing machine as claimed in claim 1, further comprising progression display means for facilitating visual confirmation of the progression of said operation program.

3. An automatic washing machine as claimed in claim 2, wherein said selecting means and said progression display means are disposed on a console panel forming part of a top cover member of said cabinet.

4. A method for operating an automatic washing machine which is provided with operation selector switch means for selecting the combination of a washing operation, a rinsing operation and/or a spinning operation in a selected operation program as desired and also for making a mid-course modification of the already selected operation program, said method comprising the step of comparing a newly selected operation program with the already selected operation program whereby, when the already selected operation program includes an operation included in the newly selected operation program, the operation in the already selected operation program corresponding to that included in the newly selected operation program is only continuously carried out for the predetermined run duration.

5. A method for operating an automatic washing machine as claimed in claim 4, wherein, when the already selected operation program includes none of the operations included in the newly selected operation program, the already selected operation program is cleared to be replaced by the newly selected operation program.

* * * * *